United States Patent

Buse

[11] Patent Number: 5,831,364
[45] Date of Patent: Nov. 3, 1998

[54] ENCAPSULATED MAGNET CARRIER

[75] Inventor: Frederic W. Buse, Allentown, Pa.

[73] Assignee: Ingersoll-Dresser Pump Company, Liberty Corner, N.J.

[21] Appl. No.: 787,464

[22] Filed: Jan. 22, 1997

[51] Int. Cl.[6] .................................................. H02K 1/30
[52] U.S. Cl. ........................................... 310/156; 310/42
[58] Field of Search ....................................... 310/42, 156

[56] References Cited

U.S. PATENT DOCUMENTS

| | | | |
|---|---|---|---|
| 2,218,810 | 10/1940 | Campbell, et al. | 22/206 |
| 2,890,915 | 6/1959 | Benham | 308/135 |
| 3,380,139 | 4/1968 | Kis et al. | 29/156.5 |
| 4,008,747 | 2/1977 | Devers et al. | 164/9 |
| 4,405,873 | 9/1983 | Nondahl | 310/156 |
| 4,539,246 | 9/1985 | Landphair et al. | 428/131 |
| 4,562,303 | 12/1985 | Czech | 174/142 |
| 4,625,135 | 11/1986 | Kasabian | 310/156 |
| 4,871,301 | 10/1989 | Buse | 417/420 |
| 4,955,423 | 9/1990 | Blazek | 164/35 |
| 4,970,424 | 11/1990 | Nakamura et al. | 310/262 |
| 5,066,200 | 11/1991 | Ooka | 417/63 |
| 5,221,503 | 6/1993 | Ward et al. | 264/104 |
| 5,248,245 | 9/1993 | Behnke et al. | 417/366 |
| 5,259,486 | 11/1993 | Deane | 188/218 A |
| 5,269,664 | 12/1993 | Buse | 417/360 |
| 5,284,620 | 2/1994 | Larsen, Jr. | 420/590 |
| 5,285,874 | 2/1994 | Revyn | 188/218 R |
| 5,407,331 | 4/1995 | Atsumi | 417/420 |
| 5,525,039 | 6/1996 | Sieghartner | 417/32 |

FOREIGN PATENT DOCUMENTS

| | | | |
|---|---|---|---|
| 2952095 | 7/1980 | Germany | 310/43 |

*Primary Examiner*—Nestor Ramirez
*Assistant Examiner*—Judson H. Jones
*Attorney, Agent, or Firm*—Steven J. Rosen; Robert F. Palermo

[57] ABSTRACT

A magnet carrier includes a single piece integrally cast cage with a cast in place ferrous conducting ring circumferentially extending about a carrier axis where the cast cage has a generally U shape. The magnet carrier includes an annular axially extending base wall, an annular aft wall, or annular forward and aft end walls extending radially from the base wall, a conducting ring annular chamber that is bound by the base wall and the end walls, and a plurality of circumferentially located compartments that are bound by the annular chamber and the end walls. The ferrous conducting ring is disposed in the chamber within the cage was cast around the ring. Magnet means are disposed in each of the compartments and an annular sheathing is positioned over the compartments and bonded to the carrier such that the chamber and the compartments are hermetically sealed. The present invention includes a method of manufacturing the annular magnet carrier by forming a wax pattern of the magnet carrier with an annular conducting ring annular chamber section, placing the conducting ring over the wax pattern in the annular chamber section, and forming an investment casting shell mold around the wax pattern and conducting ring. The cast magnet carrier is then cast with the conductor ring in place by pouring molten casting material into mold, solidifying the casting material, and then separating the cast magnet carrier with the cast in place conductor ring from the surrounding mold.

10 Claims, 6 Drawing Sheets

ENCAPSULATED MAGNET CARRIER

BACKGROUND OF THE INVENTION

This invention relates generally to encapsulated magnet carriers and, more particularly, to an encapsulated magnet carrier used in magnetically driven sealless type pumps.

DISCUSSION OF THE BACKGROUND ART

A magnetically driven sealless pump is typically a centrifugal pump that has its impeller and bearing system isolated from the impeller driving mechanism by an isolating wall of a casing that seals the pumping mechanism from the surrounding environment and eliminates the necessity to use rotary seals to seal the pumped fluid against leaking along the shaft. This type of pump is particularly desirable when pumping corrosive or toxic fluids which are dangerous when allowed to leak. The driving mechanism is coupled to the pump impeller by an arrangement of magnets located on the opposite sides of the isolating wall which magnetically connects the torque of the driving mechanism to the impeller.

A magnetically driven sealless centrifugal pump typically includes an inner magnet carrier mounted on the shaft. The inner magnet carrier must be sealed against leakage and be corrosion resistant. Inner magnets are disposed in individual chambers disposed around the carrier and in contact with a conducting ring and in the arrangement of magnets located on the opposite must include an impeller bearing system which is independent of the motor driving bearings and, therefore, necessitates that the impeller bearing system carry the full load on the impeller including both radial and thrust forces.

In the past, a designer of this type of pump generally used a carrier made with an "L" cross-sectionally shaped inner piece typically made from a 316 stainless steel or an alloy casting on wrought bar stock. After the initial machining of the carrier, a circumferential row of magnets having a ferrous conducting ring in contact with block magnets are pressed onto the carrier. The conducting ring is usually machined with a three decimal place tolerance ID (inner diameter) and a flat for each block magnet on the OD (outer diameter). The flat retains the block magnet in its peripheral position. After the row or rows of block magnets are pressed in place, an "L" cross-sectionally shaped outer shield is placed over the magnets. The outer shield is made from solid wrought bar or heavy wall tubing. Investment castings were experimented with but the casting proved to be too porous. After the shield is in place, it is welded to the "L" cross-sectionally shaped inner piece at both ends of the "L" shaped shield, thus, forming a waterproof encapsulated chamber containing the magnetic blocks. When energized magnets are used electron beam welding is used for the welding. When un-energized magnets are used TIG (Tungsten Inert Gas) welding may be used. After the shield is welded in place, the carrier is given final welding and then balanced. This process involves many steps and includes a difficult machining of the flats on the conducting ring which is due to the small tolerances that are desired. Furthermore, the welding "L" shaped shield at two ends of the L involve two different radii of those ends and makes the assembly more difficult to weld and differential thermal growth can produce shortened life span for the carrier. The L shaped shield is also costly to manufacture and weld because of its shape and required tolerances.

The present invention is designed to provide a better design with additional features and improvements as compared to that of the prior art. The present invention is designed to provide a less expensive and easier to construct magnet carrier with improved strength and wear capabilities. The U shape of the magnet carrier welded to tube sheathing provides improved structural and wear capabilities as well as an easier and less expensive method of manufacturing the magnet carrier.

SUMMARY OF THE INVENTION

A magnet carrier includes a single piece integrally cast cage with a cast in place ferrous conducting ring circumferentially extending about a carrier axis where the cast cage has a generally L or U shape cross-section. The magnet carrier includes an annular axially extending base wall, at least an annular aft end wall extending radially from the base wall, a conducting ring annular chamber that is bound by the base wall and the end wall, and a plurality of circumferentially located compartments that are bound by the annular chamber and the end wall. The ferrous conducting ring is disposed in the chamber within the cage which was cast around it. A more particular embodiment provides one magnet means for providing a magnetic field in each of the compartments and an annular sheathing positioned over the compartments and bonded to the carrier such that the chamber and the compartments are hermetically sealed. The magnet means may be adhesively bonded to the conducting ring. The magnet means may have a substantially rectangular block shape with a circular surface opposite the sheathing and circumscribed about the carrier axis. The cage may further include magnet spacing fingers axially extending from the end walls between the chambers. The fingers may be formed by shoulder slots formed at ends of the chambers in the end walls and annular grooves formed in the end walls beneath the slots. The magnet carrier may further include a can-annular web extending from the cage to a shaft bore wherein the web is integrally cast with the cage to form a single piece magnet holder. The cage is preferably made of stainless steel. The ring is preferably made of a ferrous material chosen from a group of ferrous materials comprising cast iron and carbon steel 1010, carbon steel 1001, and carbon steel. The sheathing is preferably made of 300 stainless steel tubing.

The present invention includes a method of manufacturing the annular magnet carrier by forming a wax pattern of the magnet carrier. The pattern has a cage section with an annular axially extending base wall section and annular forward and aft end wall sections extending radially from the base wall section, an annular conducting ring annular chamber section that is bound by the base wall section and the end wall sections, and a plurality of circumferentially located compartment sections that are bound by the annular chamber and the end wall sections. Next, a conducting ring is placed over the wax pattern and positioned in the conducting ring annular chamber section and an investment casting shell mold is formed around the wax pattern and conducting ring. The forming of the wax pattern may include forming the wax pattern with slot sections in the end wall sections. The cast magnet carrier is then cast with the conductor ring in place by pouring molten casting material into mold, solidifying the casting material, and then separating the cast magnet carrier with the cast in place conductor ring from the surrounding mold. The method further includes placing one magnet in each of a plurality of circumferentially located compartments that are bound by the ring and the end walls of the cage, positioning a sheathing over the cage and welding the sheathing to the end walls. Preferably, the method further also includes forming circumferentially disposed magnet spacing fingers by machining undercut annular grooves in end walls of the cage of the cast magnet carrier beneath the slots in the end walls. Preferably, each of the magnets has a substantially rectangular block shape opposite which the sheathing is to be positioned and are machined to form a circular surface circumscribed about the carrier axis.

ADVANTAGES OF THE INVENTION

The magnet carrier and method of production of the present invention is advantageous as compared to that of the prior art because it is less expensive and easier to manufacture and has improved structural and wear capabilities that require more extensive machining and more parts. The present invention is more advantageous than the prior art because it eliminates the difficult steps of machining of flats on the conducting ring with maintaining a proper outside diameter of the ring. It also eliminates pre-machining of cage before insertion of ring.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
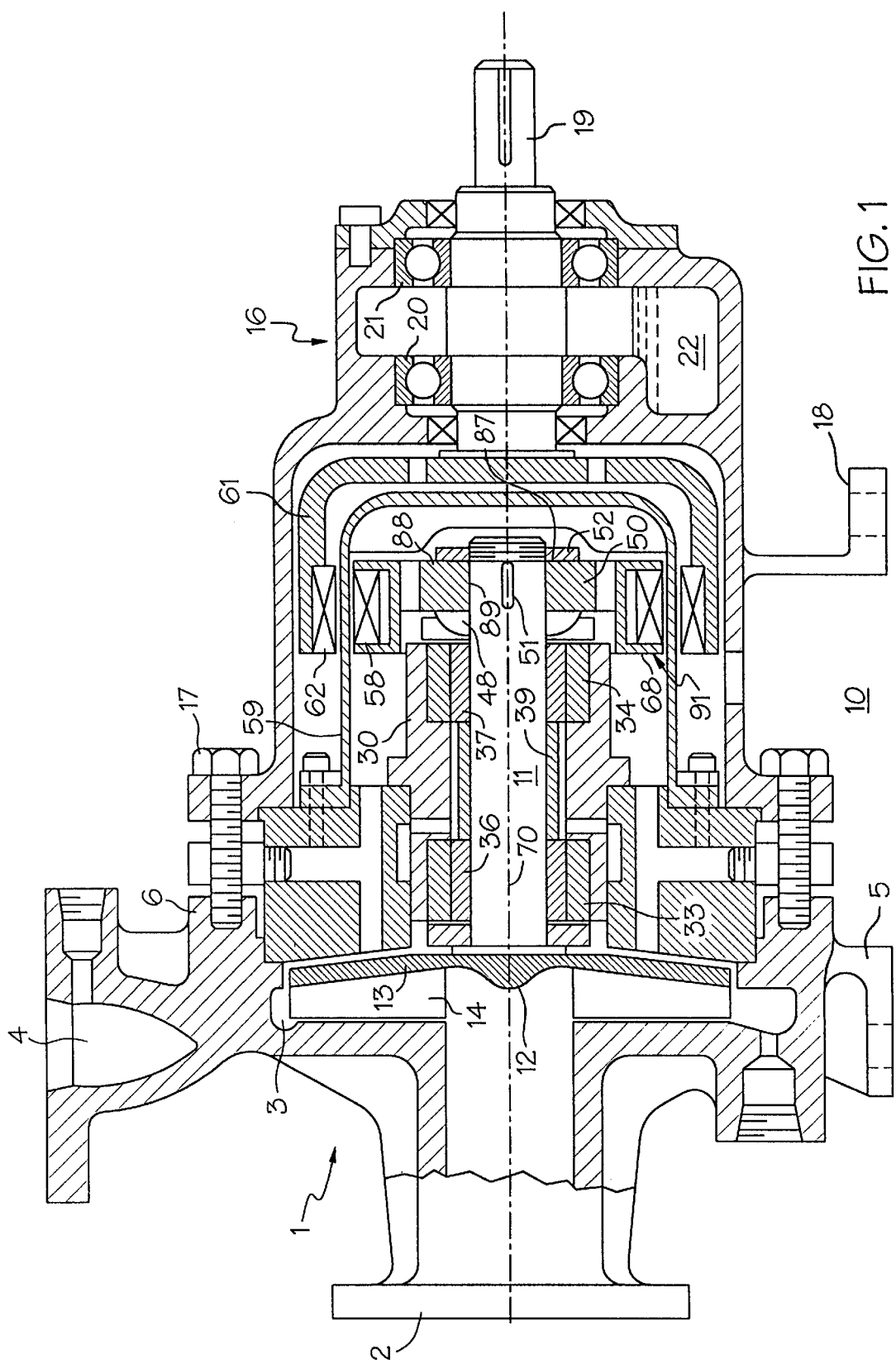
FIG. 1 is a cross-sectional view of an axial section of a sealless type of magnetically driven centrifugal pump taken along the axis of the pump shaft illustrating an inner magnet carrier in accordance with an exemplary embodiment of the present invention.
Figure 2:
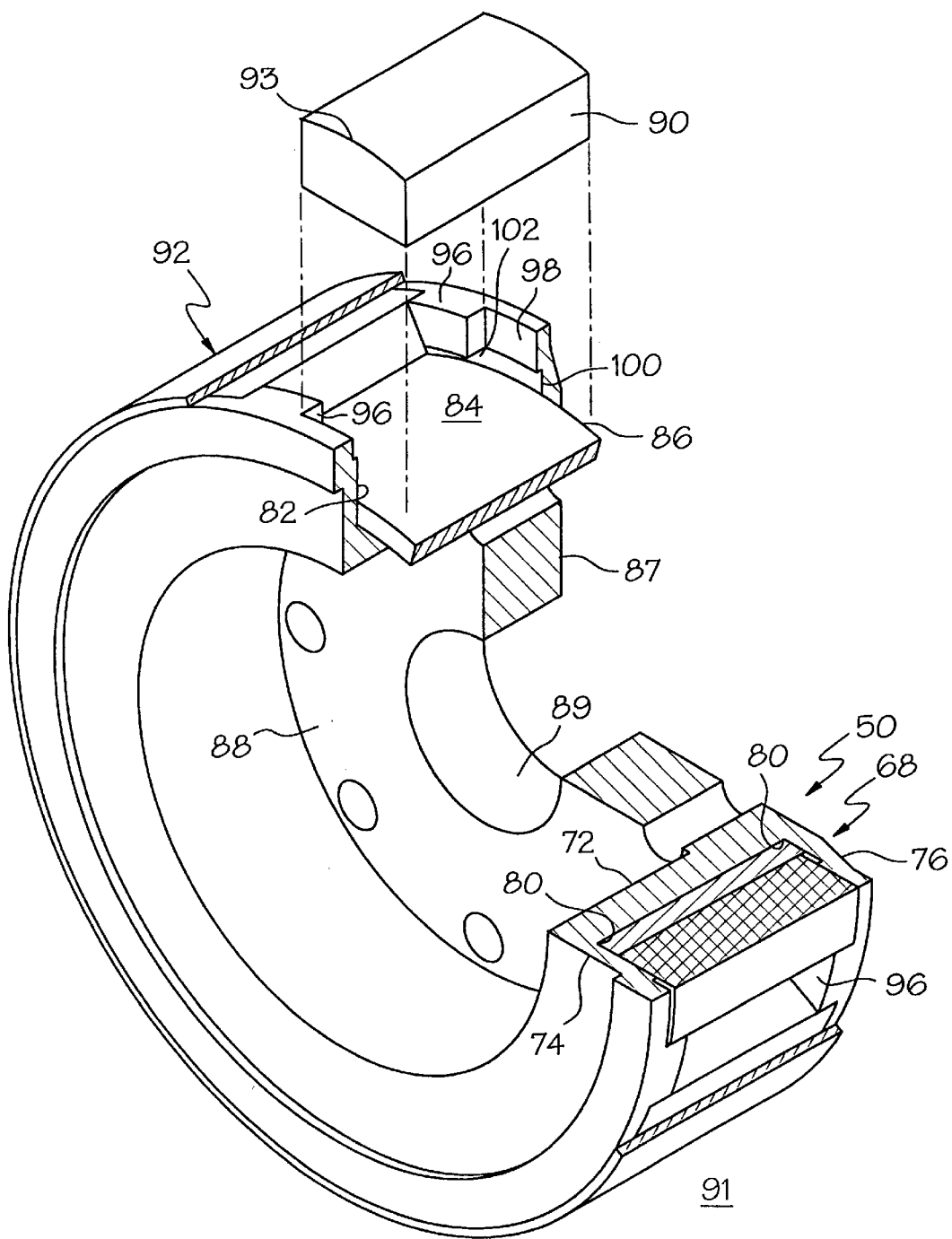
FIG. 2 is a partially exploded and partially cutaway perspective view of the inner magnet carrier in FIG. 1.
Figure 3:
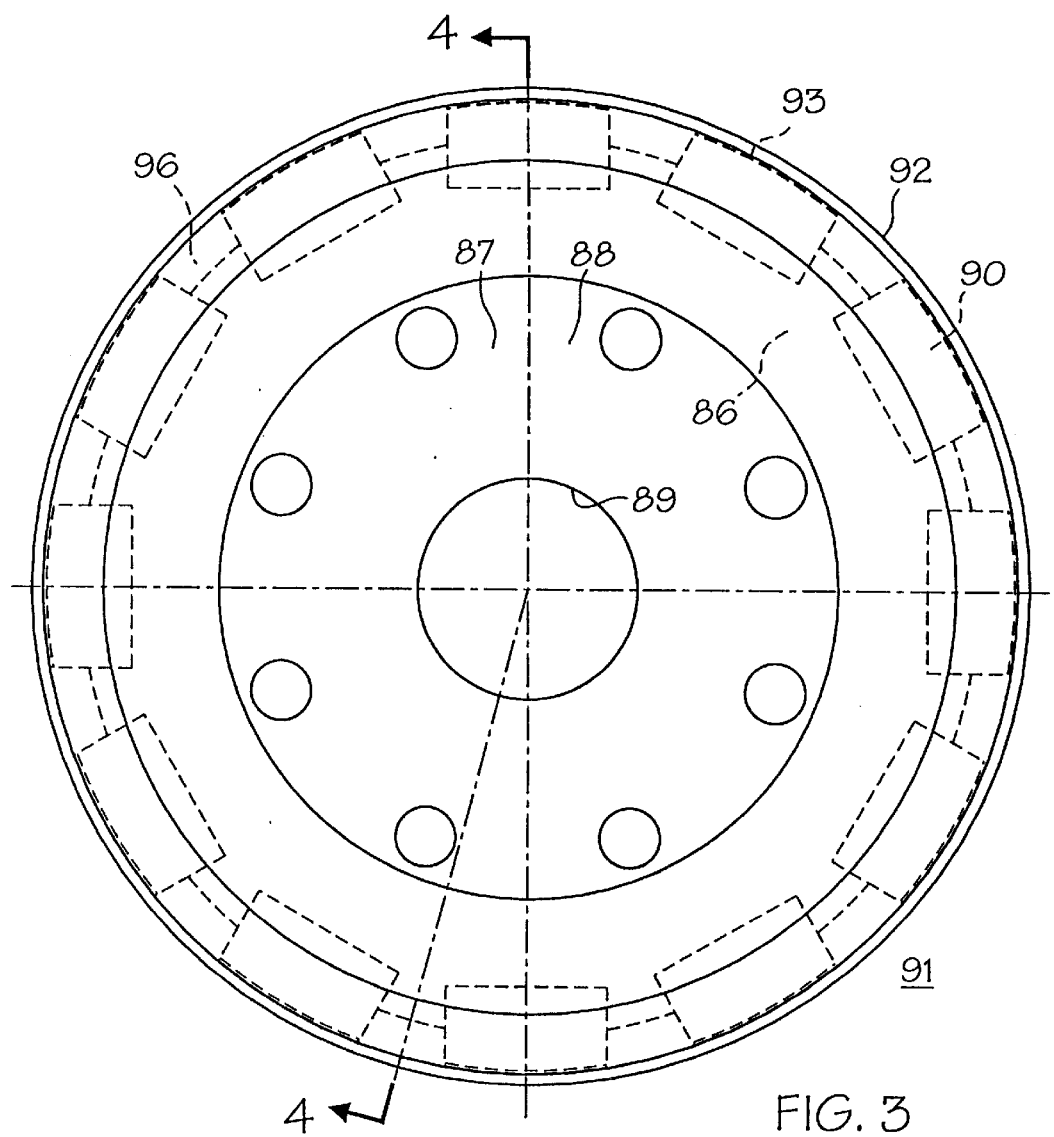
FIG. 3 is a front view of the inner magnet carrier in FIG. 2.

Referring now to the drawings in detail, wherein identical numerals indicate the same elements throughout the figures, FIG. 1 illustrates a sealless magnetically driven centrifugal pump 10 including a pump casing 1 containing an axial inlet 2, a pumping chamber 3 and an outlet 4, all of which are interconnected by passages extending through the casing. The casing 1 also contains a mounting foot 5 and an annular flange 6 surrounding the pumping chamber 3. An axially extending impeller shaft 11 carries a semi-open pump impeller 12 rotating in the pumping chamber 3 during pump operation, all of which is covered by a casing cover 30 attached to the annular flange 6. The semi-open impeller 12 includes a shroud 13 and a series of vanes 14 having one edge integral with the shroud 13. Mounted within the casing 30 are rear journal bearing bushings 33 and 34, respectively. The impeller shaft 11 extends through bushings 33 and 34 and carries respective bearing sleeves 36 and 37 rotating in the bushings 33 and 34. The bearing sleeves 36 and 37 are slipped on the shaft 11 with a spacing sleeve 39 located therebetween.

A power frame 16 fits over the casing cover 30 and is attached to the flange 6 by a series of bolts 17 circling the outside of the flange. The power frame 16 further includes a mounting foot 18 adapted to support the pump 10 in conjunction with the mounting foot 5 on the casing 1. A drive shaft 19 is rotatively mounted in the power frame 16 by a pair of axially spaced bearings 20 and 21 fixed in the frame 16 on the opposite sides of a bearing chamber 22 adapted to contain lubricant for the bearings 20 and 21. The outer end of the drive shaft 19 is adapted to be coupled to a driving motor (not shown) using a conventional coupling means.

The rear end of the impeller shaft 11 carries an inner magnet carrier 50 in accordance with an exemplary embodiment of the present invention, which is rotationally secured on the impeller shaft 11 by a key 51 in a position engaging the rear face of an aligning ring 48, and is held in place by a nut 52 threaded on the rear end of the impeller shaft 11. The nut 52 locks all of the rotating components mounted in place on the impeller shaft 11 of pump 10. The periphery of the inner magnet carrier 50 carries a series of magnets 58 which rotate closely about the interior of a relatively thin can-shaped shell 59 which fits over the inner magnet carrier 50, thus, providing a leak proof seal between the cartridge and the power frame 16. The power frame 16 contains an outer magnet holder 61 attached to and rotating with the drive shaft 19 around the can-shaped shell 59 in close proximity thereto. The outer magnet holder 61 carries a series of magnets 62 spaced around its interior which are magnetically linked to the magnets 58 on the inner magnet carrier 50 for transmitting torque from the outer magnet holder 61 to the pump impeller shaft 11. Further details of this type of pump are disclosed in U.S. Pat. No. 4,871,301, issued Oct. 3, 1989, titled "Centrifugal Pump Bearing Arrangement", invented by the present inventor Frederic W. Buse. Driving a pump impeller using magnets in this manner is well known in the art of sealless pumps. The present invention provides a new, unique and unobvious construction and method of manufacture of the inner magnet carrier 50. The inner magnet carrier 50 of the present invention preferably includes a can-annular web 88 extending from the cage 68 to an inner rim 87 about a shaft bore 89 where the web is integrally cast with the cage to form a single cast piece inner magnet holder 91 of the inner magnet carrier as shown in more detail in FIGS. 2–5b. Note that, although shown with forward and aftward annular end walls, the carrier can also be formed with only the aft end wall. (Not shown) The choice of design depends on size and fabricability preferences of the manufacturer.

Referring now to FIGS. 2–5b, the inner magnet carrier 50 has a single piece integrally cast cage 68 circumferentially extending about a carrier axis 70, which of course coincides with the axis of the impeller shaft 11 (shown in FIG. 1), and preferably includes an axially extending annular base wall 72, annular forward and aft end walls 74 and 76, respectively, extending radially from axially opposite ends 80 of the base wall, an annular chamber 82 that is bound by the base wall 72 and the end walls, and a plurality of circumferentially located compartments 84 that are bound by the annular chamber and the end walls 74 and 76. A ferrous conducting ring 86 is disposed in the annular chamber 82 and about which the cage 68 was cast.

Figure 5B:
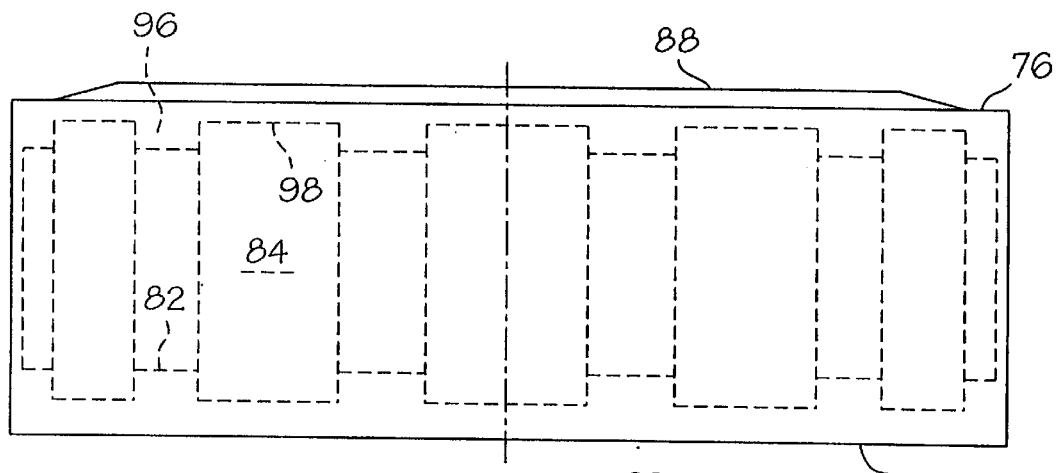
FIG. 5b is a side view of the inner magnet carrier in FIG. 3.

A more particular embodiment provides one magnet means for providing a magnetic field in the form of either energized or un-energized bar magnets 90 in each of the compartments 84. An annular sheathing 92 is positioned over the compartments 84 and magnets 90 and is bonded, preferably, by welding to the inner magnet carrier 50 such that the annular chamber 82 and the compartments are hermetically sealed. The magnets 90 may be adhesively bonded to the conducting ring 86. The magnets 90, preferably, have a substantially rectangular block shape with a circular surface 93 opposite the sheathing 92 and circumscribed about the carrier axis 70 concentric with the sheathing, as shown in FIGS. 4 and 5b.

The cage 68, preferably, further includes magnet spacing fingers 96 axially extending from the annular forward and aft end walls 74 and 76, respectively, between the chambers. The fingers may be formed by shoulder slots 98 formed at ends 100 of the chambers 82 in the end walls and undercut annular grooves 102 formed in the forward and aft end walls 74 and 76, respectively, beneath the slots. The cage 68 and the rest of the magnet holder 91 is preferably made of stainless steel. The conducting ring 86 is preferably made of a ferrous material chosen from a group of ferrous materials comprising cast iron and carbon steel 1010, carbon steel 1001, and carbon steel. The sheathing 92 is preferably thin 300 stainless steel tubing.

Figure 4:
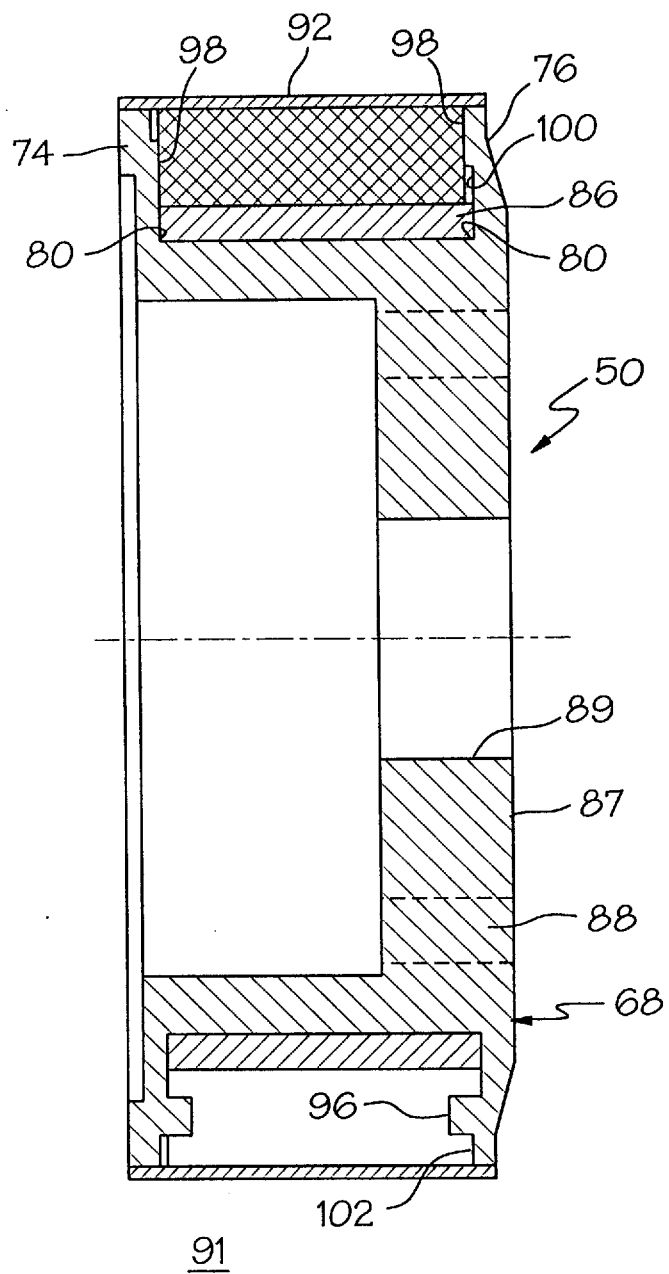
FIG. 4 is a cross-sectional view of the inner magnet carrier through 4—4 in FIG. 3.
Figure 5A:
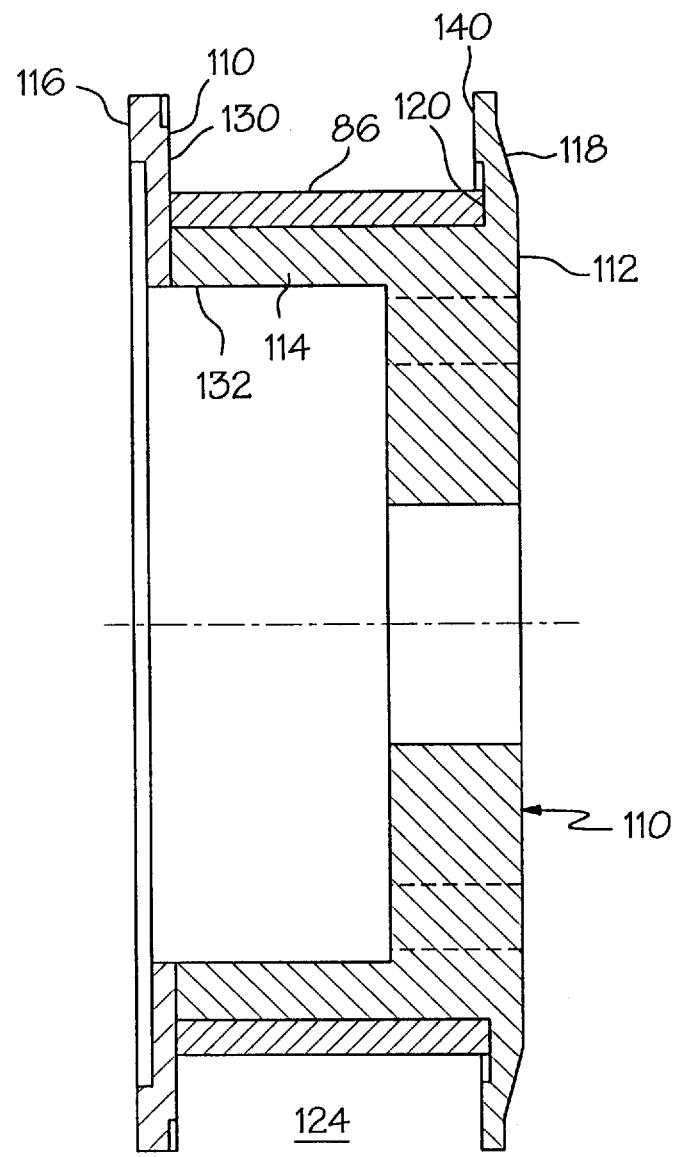
FIG. 5a is a cross-sectional view of a wax pattern used to manufacture the inner magnet carrier in FIG. 2.
Figure 6:
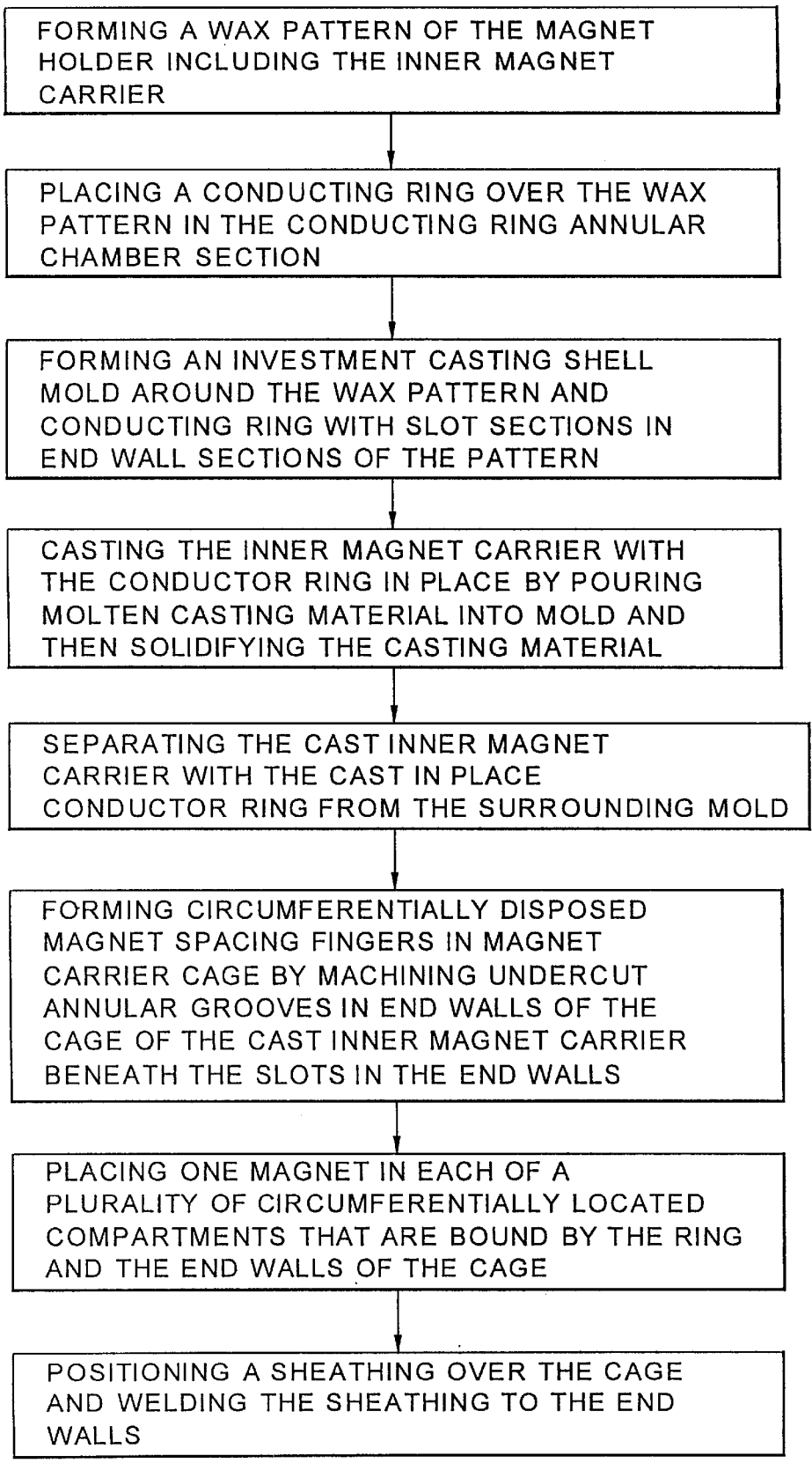
FIG. 6 is a flow chart illustrating a method of making an inner magnet carrier in accordance with an exemplary embodiment of the present invention.

The present invention includes a method of manufacturing the annular inner magnet carrier, illustrated by the flow chart in FIG. 6, by first forming a wax pattern 110 illustrated in FIG. 5a of the inner magnet holder 91 including the inner magnet carrier 50, web 88, and rim 87 as illustrated in FIGS. 1–5. Referring to FIGS. 4 and 5a, the pattern 110 has a cage section 112 with an annular axially extending base wall section 114 and annular forward and aft end wall sections 116 and 118, respectively, or aft end wall section 118,only, extending radially from the base wall section, an annular conducting ring annular chamber section 120 that is bound by the base wall section and the end wall sections, and an annular compartment section 124 bound by the annular chamber and the end wall sections. The wax pattern 110 is formed in at least first and second portion 130 and 132, respectively, so that the conducting ring 86 can be placed over the second portion 132 of base wall section 114 of the wax pattern 110 and positioned in the conducting ring annular chamber section 120. Next, an investment casting shell mold is formed around the wax pattern 110 upon which is mounted in place the conducting ring 86. The forming of the wax pattern may include forming the wax pattern with slot sections 140 in the forward and aft end wall sections 116 and 118, respectively. The cast inner magnet carrier 50 is then cast with the conductor ring 86 in place around the wax pattern 110 by pouring molten casting material into mold. The molten casting material is then solidified and the cast inner magnet carrier 50 with the cast in place conductor ring 86 is then separated from the surrounding mold. Preferably, the method further also includes forming circumferentially disposed magnet spacing fingers by machining undercut annular grooves in end walls of the cage of the cast inner magnet carrier beneath the slots in the end walls. The method further includes placing one magnet 58 in each of a plurality of circumferentially located compartments that are bound by the ring and the end walls of the cage, positioning a sheathing 92 over the cage 68 and welding the sheathing to the forward and aft end walls 74 and 76, respectively. When only the aft end wall is cast on the magnet carrier, the sheathing must either have a complimentary L-shaped cross-section to that of the carrier, or it must be made in two separate sections to form the L-section. Preferably, each of the magnets has a substantially rectangular block shape opposite which the sheathing is to be positioned and are machined to form a circular surface circumscribed about the carrier axis and concentric to the sheathing which is preferably made from thin stainless steel tubing.

While the preferred embodiment of our invention has been described fully, in order to explain its principles, it is understood that various modifications or alterations may be made to the preferred embodiment without departing from the scope of the invention as set forth in the appended claims.

What is claimed is:

1. A magnet carrier, comprising:

a single piece integrally cast cage circumferentially extending about a carrier axis and having an annular axially extending base wall and at least an annular aft end wall extending radially from said base wall;

a conducting ring annular chamber that is bound by said base wall and said end wall;

a plurality of circumferentially located compartments that are bound by said annular chamber and said end wall; and a ferrous conducting ring disposed in said chamber and about which said cage was cast.

2. A magnet carrier as claimed in claim 1 further comprising:

one magnet means for providing a magnetic field disposed in each of said compartments and an annular sheathing over said compartments and bonded to said carrier such that said chamber and said compartments are hermetically sealed.

3. A magnet carrier as claimed in claim 2 wherein said each of said magnet means is adhesively bonded to said conducting ring.

4. A magnet carrier as claimed in claim 3, wherein said magnet means has a substantially rectangular block shape with a circular surface opposite said sheathing and circumscribed about said carrier axis.

5. A magnet carrier as claimed in claim 4, wherein said cage further includes magnet spacing fingers axially extending from said end walls between said chambers.

6. A magnet carrier as claimed in claim 5, wherein said fingers are formed by shoulder slots formed at ends of said chambers in said end wall and annular grooves formed in said end walls beneath said slots.

7. A magnet carrier as claimed in claim 6, further comprising:

a can-annular web extending from said cage to a shaft bore wherein said web is integrally cast with said cage to form a single piece magnet holder.

8. A magnet carrier as claimed in claim 2, wherein said cage is made of stainless steel.

9. A magnet carrier as claimed in claim 8, wherein said ring is made of a ferrous material chosen from a group of ferrous materials comprising cast iron and carbon steel 1010, carbon steel 1001, and carbon steel.

10. A magnet carrier as claimed in claim 9, wherein sheathing is 300 stainless steel tubing.

* * * * *